(12) United States Patent
Stroud

(10) Patent No.: US 6,570,293 B1
(45) Date of Patent: May 27, 2003

(54) ALTERNATOR ROTOR COIL

(76) Inventor: Leburn W. Stroud, 321 Chantilly Ct., Hurst, TX (US) 76054

( * ) Notice: Subject to any disclaimer, the term of this patent is extended or adjusted under 35 U.S.C. 154(b) by 26 days.

(21) Appl. No.: 09/834,715

(22) Filed: Apr. 13, 2001

(51) Int. Cl.[7] .............................. H02K 3/00; H02K 1/22
(52) U.S. Cl. ...................... 310/263; 310/184; 310/198
(58) Field of Search .................................. 310/263, 180, 310/179, 184, 195, 198, 199

(56) References Cited

U.S. PATENT DOCUMENTS

| | | | | |
|---|---|---|---|---|
| 4,454,464 A | * | 6/1984 | Stroud | 219/133 |
| 4,549,106 A | * | 10/1985 | Stroud | 310/184 |
| 5,296,778 A | * | 3/1994 | Stroud | 310/179 |
| 5,424,599 A | | 6/1995 | Stroud | 310/198 |
| 5,998,891 A | * | 12/1999 | Chen et al. | 310/68 D |

* cited by examiner

Primary Examiner—Dang Dinh Le
(74) Attorney, Agent, or Firm—Arthur F Zobal

(57) ABSTRACT

The invention relates to an alternator having a stator core with a rotor located in the opening of the stator core for rotation therein. The rotor coil has 455 turns of 17.5 gauge wire with a resistance of about 1.9 ohms with rotor pole members having an outside diameter of 4.76 inches. The radial distance between the outside diameter of the rotor pole members and the inside diameter of the stator core is about 0.002–0.003 of an inch.

3 Claims, 6 Drawing Sheets

ALTERNATOR ROTOR COIL

BACKGROUND OF THE INVENTION

1. Field of the Invention

The invention relates to an alternator for use for charging the battery of a motor vehicle.

2. Description of the Prior Art

The invention may be used to enhance the output of the system of U.S. Pat. No. 5,424,599, which patent is incorporated into this application by reference.

SUMMARY OF THE INVENTION

The invention comprises a rotor coil having 455 turns of 17.5 gauge wire with a resistance of about 1.9 ohms and with rotor pole members having an outside diameter of 4.76 inches. The radial distance between the outside diameter of the rotor pole members and the. inside diameter of the stator core is about 0.002–0.003 of an inch. This rotor enhances the output of the system of U.S. Pat. No. 5,424,599 and required much calculations, trial and error, and testing to produce the rotor and coil to obtain the enhanced output desired.

DESCRIPTION OF THE PREFERRED EMBODIMENTS

Figure 1:
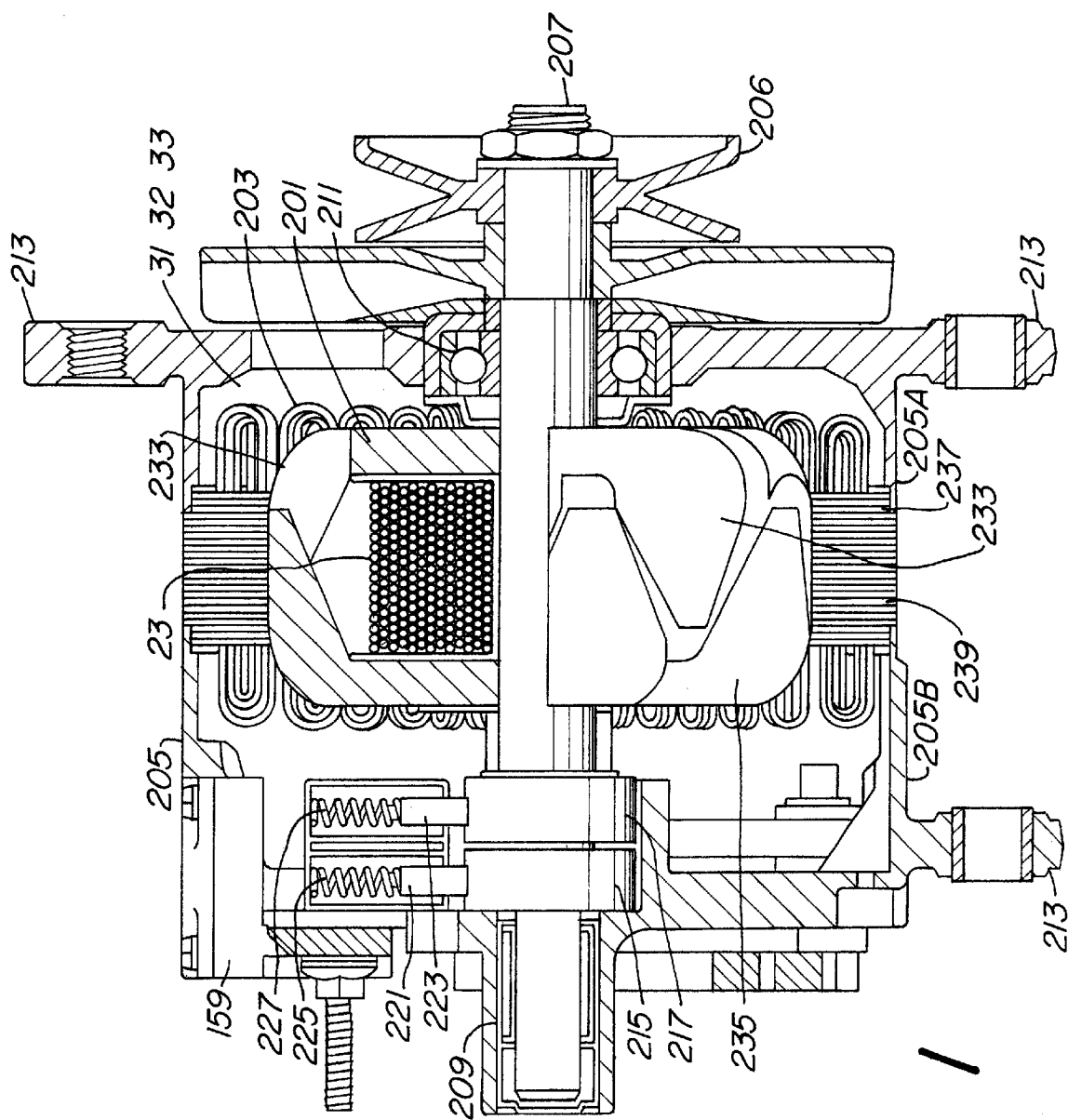
FIG. 1 is a cross section of an alternator.

Referring now to FIG. 1 of the application, the alternator comprises a rotor 201 and a stator 203, the latter of which is fixedly carried by a housing or case 205 comprising front and rear portions 205A and 205B secured together by bolts (not shown). Rotor 201 is rotatably carried by a shaft 207 which is journaled by roller bearing 209 and ball bearings 211 to the case 205. Brackets 213 formed to the case 205 are adapted to receive bolts for coupling the alternator to mounting means adjacent the engine of the vehicle. A pulley 206 is mounted to the shaft 207 for receiving the belt from the engine for rotating the rotor 201.

Figure 2:
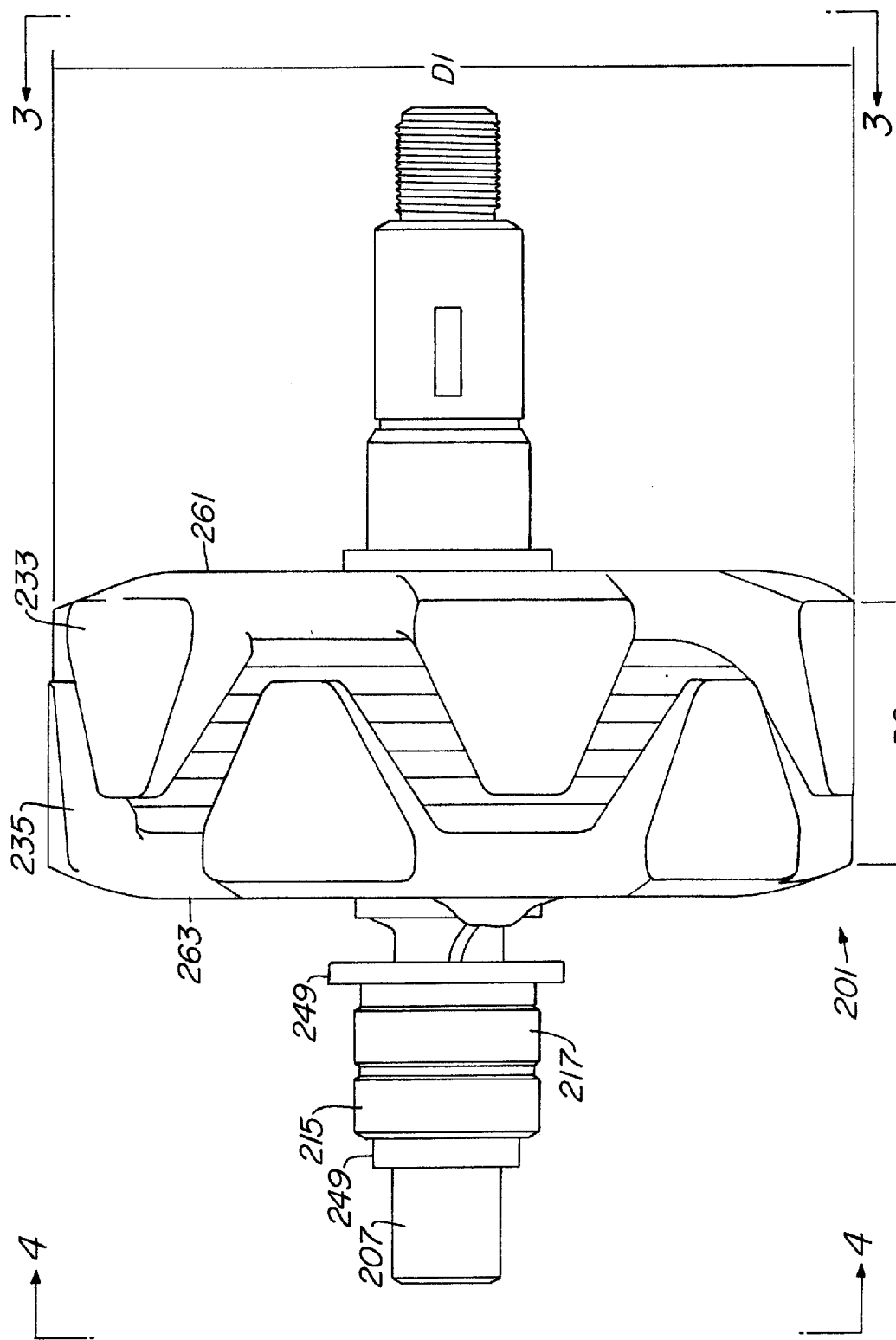
FIG. 2 is a side view of the rotor of the invention.
Figure 4:
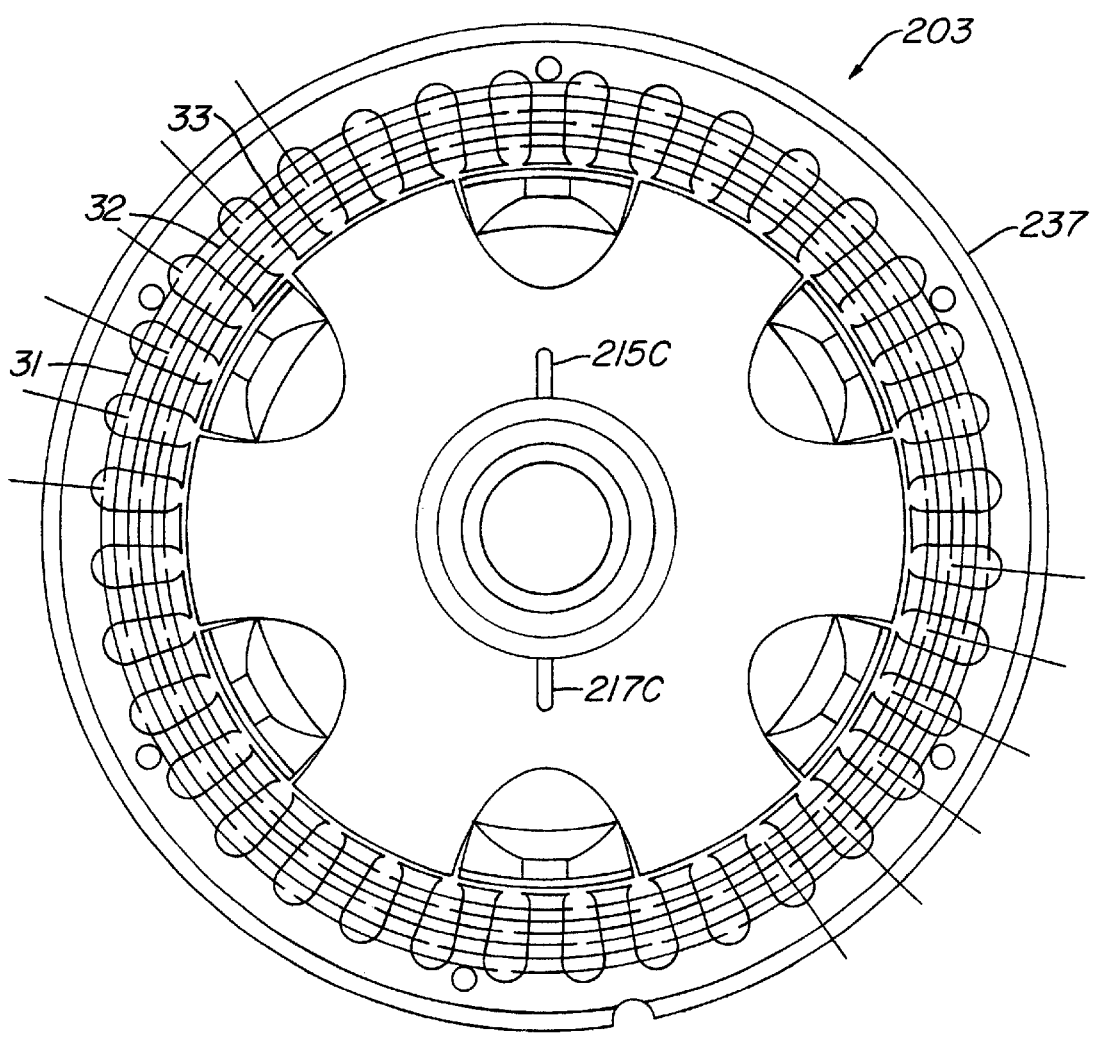
FIG. 4 is an end view of the rotor of FIG. 2 as seen along lines 4—4 thereof with the rotor shown located within the stator core.

Referring also to FIGS. 2 and 4, shaft 207 has two slip rings 215 and 217 mounted rigidly to it and electrically insulated from each other by member 249 and from the shaft. Slip rings 215, 217 are connected by conductors 215C and 217C to the two ends of the coil 23 of rotor 201. Carbon brushes 221 and 223 are biased by springs 225 and 227 into sliding contact with the slip rings 215 and 217. Slip rings 215 and 217 apply a voltage to the rotor 201 from a regulator.

Referring to FIGS. 2–5, rotor 201 comprises two spaced apart annular ferro-magnetic core members 261 and 263 having central apertures 261A and 263A through which the shaft 207 extends. The coil 201 is located between the members 261 and 263.

Figure 6:
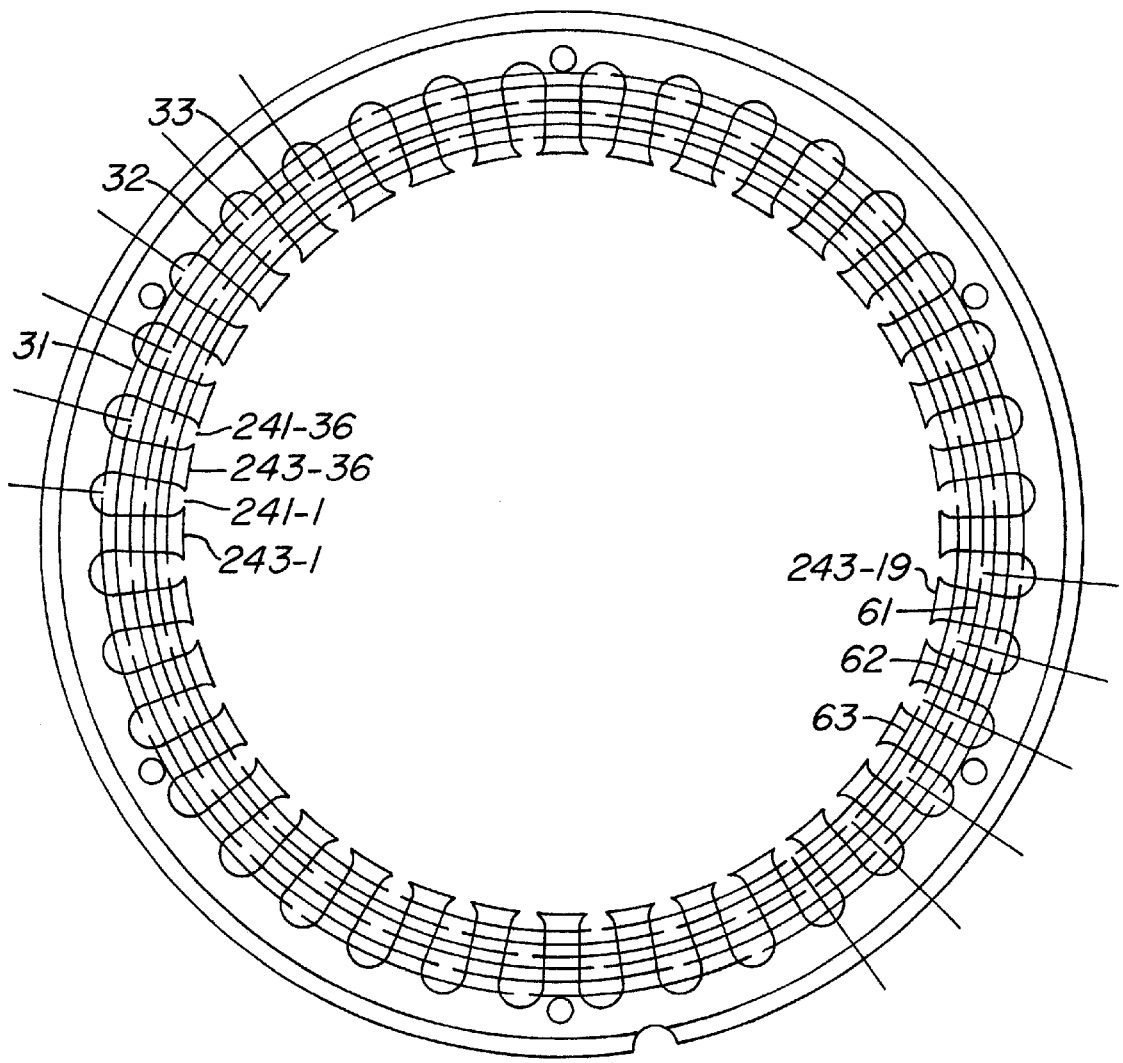
FIG. 6 illustrates a side view of the stator coil with the coils shown schematically.

Referring also to FIG. 6, stator 203 comprises an annular core 237 formed of a plurality of stacked ferro-magnetic plates 239. A plan view of the core 237 is shown in FIG. 6 of this application. As seen in this Figure, there are thirty-six slots 241 formed in the stator core 237. Slots 241 extend parallel to the axis of the core 237 the full width of the core. The thirty-six portions of the core between the slots 241 are defined as the segments 243. Electrically insulating inserts (not shown) are located in the slots between the wires and the core. Rotor 201 is supported within the stator core 237, with the poles 233 and 235 being spaced from segments 243.

Figure 3:
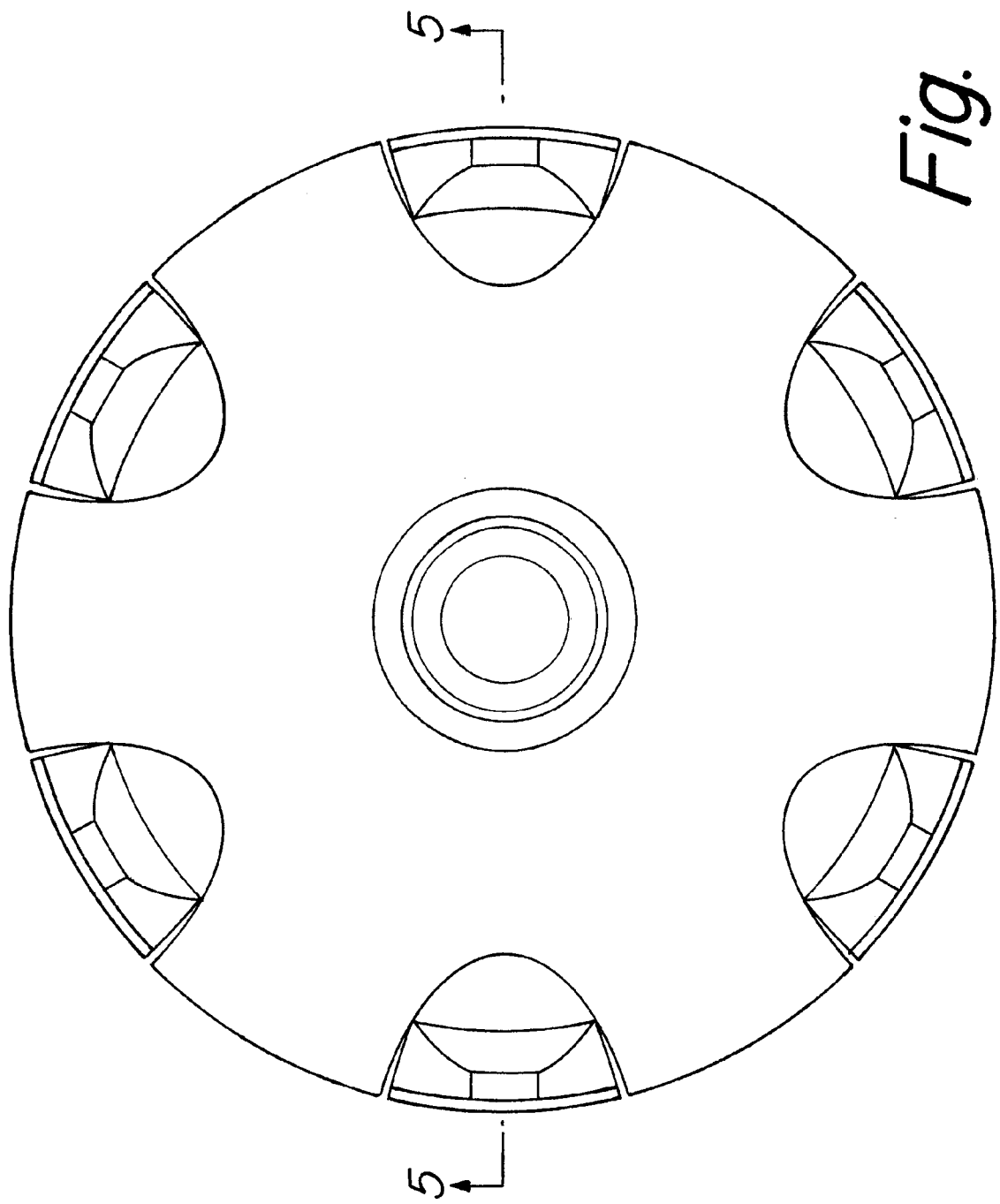
FIG. 3 is an end view of the rotor of FIG. 2 as seen along lines 3—3 thereof.

The alternator comprises two three phase coils identified as 31, 32, 33 and 61, 62, 63. Each coils is identical. The turns of winding 31 and the manner in which it is wound on the stator core 237 is shown in FIGS. 2 and 3 of the U.S. Pat. No. 5,424,599. Each group of coils on the stator core 237 is schematically illustrated in FIG. 6 of this application. For a detailed description of these coils and the manner in which they are wound on the core 237, reference is made to U.S. Pat. No. 5,424,599.

Figure 5:
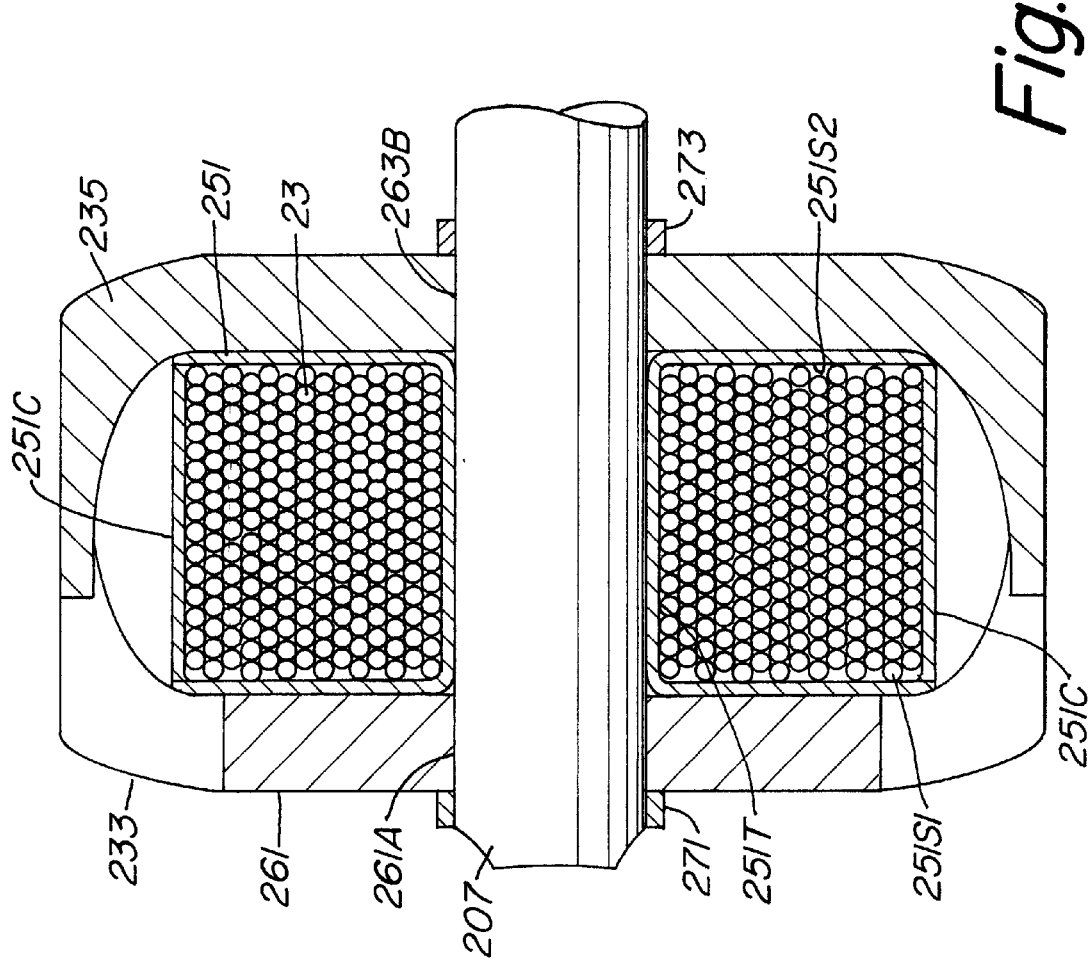
FIG. 5 is a cross sectional view of FIG. 3 as seen along lines 5—5 thereof.

Referring to FIG. 5, the coil 23 is wound on an electrically insulated spool 251 which is located around the shaft 207 and held between the two annular core portions 261 and 263. The spool 251 comprises a tubular member 251T and two annular side walls 251S1 and 251S2. The outer portion of the coil 251 is covered with an electrically insulating cover 251C. The end portions 261 and 263 are formed of ferro magnetic material and each has six spaced apart north and south poles 233 and 235. The poles extend inward and mesh, but poles 233 and 235 do not touch each other. The core members 261, 263 are pressed fitted on the shaft 207 and held in place against the spool 251 by rings 271 and 273. In the assembly process, core portion 261 may be pressed on the shaft 207 in place, spool 251 with the coil 23 wound in place on the spool 251, next is located on the shaft 207 next to core portion 261 and core portion 263 pressed on the shaft 207 next to the spool 251.

The coil 23 has 455 turns of 17.5 gauge copper wire with a resistance of about 1.9 ohms. The rotor poles 233 and 235 have an outside diameter of 4.76 inches. The radial distance between the outside diameter of the rotor poles and the inside diameter of the stator core is about 0.002–0.003 of an inch. The spool 251 has an inside diameter of 4 inches and a width between its end walls of 1.44 inches. These parameters were determined to be the optimum parameters to obtain an increased output of the alternator only after much calculations, and testing.

In FIG. 2 D1 is equal to 4.76 inches and D2 is equal to 2.433 inches.

What is claimed is:

1. An alternator comprising:

an annular stator having a central annular opening and comprising a ring shaped stator core formed of a plurality of stacked ferro magnetic plates, said annular opening defining an inside annular perimeter extending around a central axis and having a given inside diameter with a plurality of angular spaced apart slots formed into said annular core from said inside annular perimeter, a plurality of stator coils wound on said stator core and extending through said slots, an annular rotor comprising a rotatable shaft having first and second ends, first and second spaced apart ferro magnetic rotor core members each comprising a plate having a central opening through which said shaft extends and a plurality of annularly spaced apart pole members spaced radially from said shaft and which extends away from said plate such that said pole members of said first rotor core member extend toward said second rotor core member and said pole members of said second rotor core member extend toward said first rotor core member, with each pole member of said first rotor member being located between and spaced from adjacent pole members of said second rotor member and with each pole member of said second rotor core member being located between and spaced from adjacent pole members of said first rotor core member, said pole members of said first and second rotor core members having a given outside diameter, a spool comprising a tubular member with a central opening through which said shaft extends and first and second annular side walls defining an annular coil space, a rotor coil of metal wire wound in said coil space of said spool, said spool and said rotor coil of wire being located between said two plates of said first and second rotor core members and radially inward of said pole members, said rotor coil being formed of 17.5 gauge wire with a resistance of about 1.9 ohms and having 455 turns around said spool, the outside diameter of said pole members being 4.76 inches and the distance between said outside diameter of said pole members and said inside diameter of said annular perimeter of said stator being about 0.002–0.003 of an inch.

2. An alternator comprising:

an annular stator having a central annular opening and comprising a ring shaped stator core formed of a plurality of stacked ferro magnetic plates, said annular opening defining an inside annular perimeter extending around a central axis and having a given inside diameter with a plurality of angular spaced apart slots formed into said annular core from said inside annular perimeter, a plurality of stator coils wound on said stator core and extending through said slots, an annular rotor comprising a rotatable shaft having first and second ends, first and second spaced apart ferro magnetic rotor core members each comprising a plate having a central opening through which said shaft extends and a plurality of annularly spaced apart pole members spaced radially from said shaft and which extends away from said plate such that said pole members of said first rotor core member extend toward said second rotor core member and said pole members of said second rotor core member extend toward said first rotor core member, with each pole member of said first rotor member being located between and spaced from adjacent pole members of said second rotor member and with each pole member of said second rotor core member being located between and spaced from adjacent pole members of said first rotor core member, said pole members of said first and second rotor core members having a given outside diameter, a spool comprising a tubular member with a central opening through which said shaft extends and first and second annular side walls defining an annular coil space, a rotor coil of metal wire wound in said coil space of said spool, said spool and said rotor coil of wire being located between said two plates of said first and second rotor core members and radially inward of said pole members, said rotor coil being formed of 17.5 gauge wire, having 455 turns around said spool, the outside diameter of said pole members being 4.76 inches.

3. The alternator of claim 2, wherein:

the rotor coil has a resistance of 1.9 ohms, the distance between said outside diameter of said pole member and said inside diameter of said annular perimeter being 0.002–0.003 of an inch.

* * * * *